NONLINEAR PULSE CODE MODULATION SYSTEM

Filed Sept. 1, 1948 4 Sheets-Sheet 1

INVENTOR
L. A. MEACHAM
BY Geo. C. Ford
ATTORNEY

NONLINEAR PULSE CODE MODULATION SYSTEM

Filed Sept. 1, 1948 4 Sheets-Sheet 2

INVENTOR
L. A. MEACHAM
BY George C. Lord
ATTORNEY

April 8, 1952 L. A. MEACHAM 2,592,308

NONLINEAR PULSE CODE MODULATION SYSTEM

Filed Sept. 1, 1948 4 Sheets-Sheet 3

INVENTOR
L. A. MEACHAM
BY George C. Lord
ATTORNEY

April 8, 1952 L. A. MEACHAM 2,592,308

NONLINEAR PULSE CODE MODULATION SYSTEM

Filed Sept. 1, 1948 4 Sheets-Sheet 4

INVENTOR
L. A. MEACHAM
BY George C. Lord
ATTORNEY

Patented Apr. 8, 1952 2,592,308

UNITED STATES PATENT OFFICE 2,592,308

NONLINEAR PULSE CODE MODULATION SYSTEM

Larned A. Meacham, New Providence, N. J., assignor to Bell Telephone Laboratories, Incorporated, New York, N. Y., a corporation of New York Application September 1, 1948, Serial No. 47,255

8 Claims. (Cl. 179—43.5)

This invention relates to transmission by pulse code modulation and more particularly to coding and decoding equipment for pulse code modulation systems.

In communication systems utilizing what is known as pulse code modulation, a message wave or other signal to be transmitted is sampled periodically to ascertain its instantaneous amplitude. The measured instantaneous amplitude is expressed by pulse codes analogous to telegraph codes.

One code which conveniently may be employed in pulse code modulation (hereinafter referred to as PCM) involves permutations of a fixed number of code elements each of which may have any one of several conditions or values. An advantageous code of this type is the so-called binary code in which each of the fixed number of code elements may have either of two values. One advantageous way of representing these values is to represent one by a pulse sometimes referred to as an "on pulse" and the other by the absence of a pulse sometimes referred to as an "off pulse." Alternatively, one value may be represented by a positive pulse and the other by a negative pulse. The total number of permutations obtainable with the binary code is proportional to $2^n$ where $n$ is the number of code elements employed.

Because the total number of different amplitudes which may be represented by such a code of a fixed number of elements is limited, it is necessary to divide the continuous range of amplitude values of which the transmitted signal is capable into a fixed number of constituent ranges which together encompass the total range. Each of these smaller or constituent amplitude ranges may then be treated as if it were a single amplitude instead of a range and is represented by an individual one of the permutations of the code. In the use of this method of code transmission the instantaneous amplitude ascertained by a sampling operation is represented by the respective permutation indicative of the amplitude range, or step, which most nearly approximates the amplitude of the measured sample. If, for example, the sample amplitude is nearest to that amplitude represented by the ninth step of the signal amplitude range the permutation code corresponding to range 9 is transmitted. This process is known as quantization.

The code element signals or pulses of course require different channels for their transmission. These in general have been obtained by either frequency or time division multiplex; that is, the $n$ elements of a code group may be transmitted consecutively over a single line or frequency channel or they may be transmitted simultaneously on different frequency channels.

The reception of PCM signals involves the process of translating these signals back into the instantaneous amplitudes which they represent. If the process of sampling the message wave has been carried out at a rate which is at least twice as great as the highest frequency to be transmitted, then the reproduced amplitude samples which take the form of current or voltage impulses contain all of the frequency components of the wanted message signal. The wanted signal may be separated from the extraneous frequency components introduced by the sampling process merely by passing the reconstructed samples through a low-pass filter which effectively eliminates all frequency components greater than those in the desired frequency band. If the reconstructed samples were exactly proportional to the corresponding samples taken from the original message wave at the transmitter then the signal at the output of the low-pass filter would be a perfect replica of the original message wave except for the introduction of delay and possible change in signal level. When a finite number of code permutations ($2^n$) are employed, however, the reproduced sample amplitudes may have errors as great as plus or minus one half an amplitude step. These errors appear as a noise-like form of distortion at the output of the filter referred to above and for speech or other complex waves this distortion comprises an essentially flat band of noise that sounds much like thermal noise. Since the amplitude of this distortion is of the same order as the amplitudes of the steps forming the total amplitude range, it will appear that the steps must be at least as small as the lowest amplitude signal it is desired to transmit.

In transmitting speech with unregulated volume, for example, consonant levels may be 30 decibels weaker than vowel levels and weak talkers may be 30 decibels lower in amplitude than loud talkers. Consequently, signal amplitudes as much as 60 decibels below the maximum are of importance and steps of the order of 60 decibels smaller than the maximum range must be provided.

If all of the steps forming the total amplitude range are made of equal size an enormous total number of steps is required due to the fact that the size of the individual step must be relatively so small and this involves great complexity in the apparatus employed as a decoder for the PCM signals. It has been found desirable therefore to divide the total amplitude range into an array of steps of tapered amplitudes so distributed that the amplitudes of weak signals fall in a region for which very small steps are provided and stronger signal amplitudes extend into parts of the amplitude range where the larger steps occur. By a suitable distribution of steps and step sizes over the total possible amplitude range a desirable compromise may be secured in the relative transmission quality according to signals of various amplitudes.

Such distribution of amplitude steps is conveniently obtained in a coder by employing a plurality of attenuators which may be connected in tandem between a source of signal sample and a comparison circuit, wherein the attenuated signal sample is compared with a reference quantity ordinarily taken as representing the smallest amplitude which it is desired to transmit. In this type of coder the attenuators are introduced in turn into the tandem circuit, each affording an attenuation which is a fixed fraction of that afforded by the preceding attenuator and a comparison is made after the introduction of each attenuator, the result of these comparisons then being employed as a basis for the construction of a pulse code signaling group. Thus it will appear that large attenuations are required in the coding of signals of high amplitude whereas increasingly smaller attenuations are encountered in the coding of signals of low amplitude and that the desired tapered array of amplitude steps is obtained.

Coding by this general method however is subject to two disadvantages. The first of these is found in the fact that it is an inherent characteristic of the step distribution afforded by this method of coding that the two boundaries of each step differ from one another by a fixed value in decibels or by a fixed percentage of the mean amplitude of the step. Thus when the smallest step is taken to be equal to the smallest amplitude which it is desired to transmit it is found that the portion of the range between the lower limit of the smallest step and the lower limit of the total range is many times greater than the amplitude of the smallest step thus introducing an undesirable ambiguity at the lower limit of the range of amplitudes accepted by the coder. The other disadvantage referred to above is found in the fact that when steps of increasingly smaller amplitudes are employed, the quantities to be compared by the comparing circuit become undesirably small, with the result that the possibility of error becomes important unless highly perfected comparison circuits are employed.

Objects of the present invention are to improve the operation of PCM coders employing nonlinear comparison scales and more specifically to eliminate the ambiguities at low amplitude and to reduce the requirements for precision in the comparison circuits.

In accordance with the invention a small bias voltage equal to the difference between the limit of the smallest coding step and zero is added to the message signal sample prior to the coding process and a like quantity is subtracted from decoded amplitude sample at the receiver. Also, in accordance with the invention an amplifier having a gain equal to the attenuation introduced by the largest attenuator in the tandem arrangement of attenuators is connected between the output of the largest attenuator and the next succeeding attenuator in the chain to increase the absolute level of the quantities to be compared during the coding process.

The above and other features of the invention will be considered in greater detail in the following specification taken with the drawings in which.

Figures 1, 2:
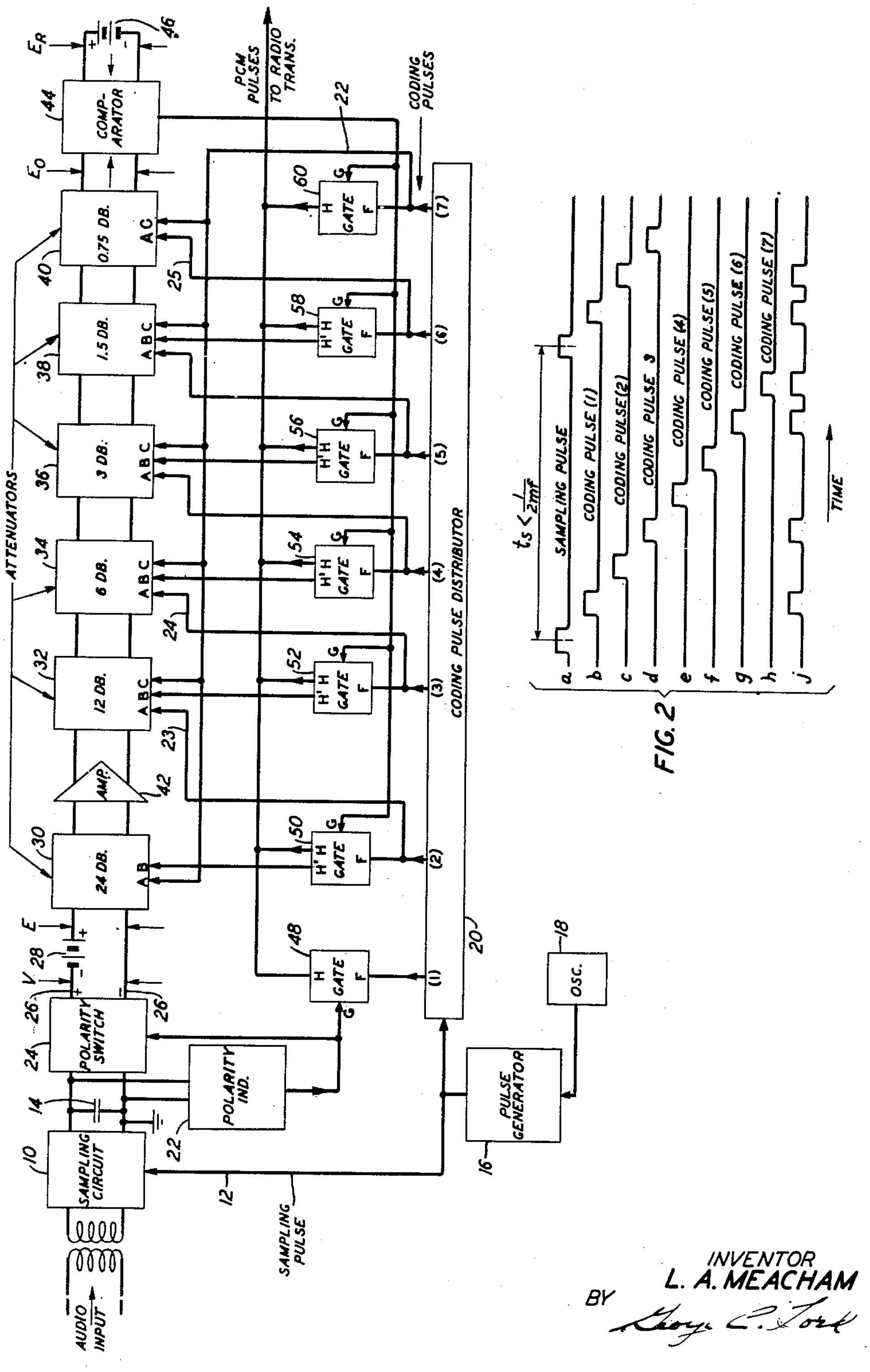
Fig. 1 is a block schematic diagram of a coder in accordance with the invention.
Fig. 2 is a timing diagram showing the wave forms and timing of certain of the pulses indicated in Fig. 1.

Referring now particularly to Fig. 1, an audio input consisting of a signal to be encoded into PCM pulses is applied through a transformer to a sampling circuit 10. This input may be the wave of a single speech or message signal although it may alternatively comprise a repetitive sequence of brief segments of the waves of a plurality of message signals to be transmitted over a single message channel by the process commonly known as time-division multiplex. Such an input signal might be obtained, for example, by connecting the input terminals of the sampling circuit to each of several speech sources in rapid cyclic succession, as by means of a conventional commutator or some electronic equivalent thereof. This input signal in either case amounts to a potential varying over a certain total range, for example from $-V_{max}$ to $+V_{max}$, as a function of time, where $V_{max}$ is the maximum absolute value of amplitude assumed by the signal.

The sampling circuit, as will be more fully described hereinafter, is a form of electronic switch, which at prescribed times, under control of sampling pulses supplied to it over lead 12, rapidly charges the capacitor 14 to the instantaneous positive or negative potential of the input signal then existing, and which, at all other times, allows the charge on the capacitor to remain unchanged, regardless of variations in the input signal. Thus the potential of the upper terminal of capacitor 14 with respect to the grounded lower terminal thereof varies stepwise from sample to sample. In accord with well-known principles of pulse transmission, if the audio signal of a single channel contains frequencies from zero to $f$, then the rate or frequency at which the corresponding samples are taken must be at least as great as $2f$, and if there are $m$ channels in time division this rate must be at least $2mf$. Accordingly, in Fig. 2, a sampling pulse wave form is shown (line $a$), having a period $t_s$ less than $1/2mf$. If $f$ is 3500 cycles, and if we consider a single-channel case ($m=1$), a suitable sampling rate is 8000 samples per second, and $t_s=125$ microseconds. A suitable pulse length would be about 5 microseconds.

The sampling pulses are generated by the pulse generator 16 which may comprise a multivibrator of the type disclosed in my Patent 2,022,969 issued December 3, 1935, shown in Fig. 1, under the control of an oscillator 18 which may conveniently be of the type disclosed in my Patent 2,163,413 issued June 10, 1939. These pulses are supplied not only to the sampling circuit 10 but also to a coding pulse distributor 20 which delivers a plurality of different pulse outputs occurring in regular succession on separate leads. The number of such different outputs depends upon the code to be employed and in the present example seven outputs are shown (Fig. 2—lines *b* to *h*), corresponding to a binary code of $n=7$ digits. These pulses control the operation of the coding instrumentalities to be described below.

The coding pulse distributor may for example comprise a tapped delay line, as disclosed in Patent 2,403,561 issued to J. P. Smith, or a chain of multivibrator circuits as in the patent to Hollywood 2,306,386, December 29, 1942.

The samples stored on the capacitor 14 are applied to a polarity indicator 22 and also to a polarity switch 24. The polarity indicator is a trigger device having two conditions of stability and giving one or the other of two voltage conditions in its output circuit in accordance with whether the sample on the capacitor 14 is positive or negative. The output of the polarity indicator is applied to the polarity switch 24, and controls the action thereof in such fashion that all positive samples are transmitted from capacitor 14 to the output leads 26 without substantial change, whereas all negative samples on the capacitor are reversed in polarity and hence are applied as positive potentials of equal magnitude across the same output leads 26. Thus the potential V of the upper of these leads with respect to the lower one is always positive and in fact represents the absolute magnitude of the samples. The bias voltage which forms an essential feature of the invention is introduced at this point and may conveniently be supplied by a battery 28 connected in the proper polarity to add a small voltage to the sample V to give a resulting output voltage E which constitutes the sample actually encoded. Since the amplitude of the bias voltage here introduced depends upon the nature of the tandem attenuators provided to effect the coding process, a more complete discussion of the reasons for the introduction of the bias and of the exact requirements to be met will be deferred until the remainder of the coding circuit has been considered in at least a general way.

Assuming that a seven-unit code in which the first pulse indicates the polarity and the remaining pulses the amplitude of the sample is to be employed, the potential E is applied to the input of a tandem arrangement of six electronically controlled attenuators 30 through 40 and an amplifier 42 which is located between the first and second attenuators as shown.

Each attenuator may assume either of two conditions, which will be referred to herein as the Loss-out and the Loss-in conditions, respectively. When in the Loss-out condition, an attenuator introduces a very small value of loss between its input and output terminals. When in the Loss-in condition, it provides an attenuation which is greater than the Loss-out value by the nominal number of decibels shown in the corresponding block in Fig. 1; that is, by 24 decibels for attenuator 20, 12 decibels for attenuator 32, and so on, the value for each attenuator being half that of the preceding stage. The final attenuator 40 has a nominal value of 0.75 decibel. For purposes of explanation, the Loss-out value of attenuation will be taken as zero, and the Loss-in value as the nominal number of decibels indicated in Fig. 1. The actual Loss-out values may be ignored since they may be considered to be added together and replaced by a fixed loss in the chain of attenuators.

By selectively switching the six attenuators to the Loss-in or Loss-out conditions in the various possible combinations, the total loss between the input and output of the chain may be given any value from zero to 47.25 decibels in steps of 0.75 decibel. Other step sizes and total attenuation may obviously be employed. The parameters chosen for the present example have been found to give telephone transmission of a grade which meets commonly accepted standards of toll practice.

The attenuators are controlled by pulses applied to control inputs designated A, B and C in Fig. 1. It will be noted that attenuators 30 and 40 are provided with only two of these three input paths. The attenuators are controlled in the following manner by pulses applied to the several inputs:

1. In the absence of any control pulse, the Loss-in or Loss-out condition is maintained without change.

2. A pulse applied at control input A changes the attenuator to the Loss-in condition, or has no effect if that condition already exists.

3. A pulse at either of control inputs B or C changes the attenuator to the Loss-out condition, or has no effect if that condition already exists.

The output potential $E_0$ of the final attenuator is applied to a comparator circuit 44, the function of which is to determine whether this output potential does or does not exceed a reference value $E_R$, here symbolized by the battery 46. The comparator has two conditions of stability, and gives one or the other of two voltage conditions in its output in accordance with whether $E_0$ is or is not greater than $E_R$. The value of the reference potential $E_R$ is preferably chosen to be smaller by one amplitude step (0.75 decibel) than the value of $E_0$ which exists when the input E has its maximum possible value and all of the attenuators are switched to the Loss-in condition. If the input E is assumed to have a maximum value of 100 volts (and disregarding the presence of the amplifier 42) $E_R$ is seen to be 48 decibels smaller than 100 volts, or 0.398 volt.

The six attenuators are controlled by gate circuits 50 through 60 respectively while an additional gate circuit 48 controls the production of the polarity pulse which occupies the first position of each code group. Each of the gate circuits has an input F, a control terminal G and an output H. All gate circuits except 48 and 60 have an additional output H′. The function of each of these gates is to transmit or not to transmit a coding pulse applied at input F to the output H (and to the additional output H′ if one is provided) according to which of the two alternative voltage conditions is applied to the control terminal G. To input F of each gate is connected the corresponding coding pulse output from the coding pulse distributor 20. The output lead from the comparator 44 is connected in multiple to the control terminal G of each of gates 50 through 60. The output lead of the polarity indicator 22 is connected to the control terminal G of gate 48. The output H of each of the gates 48 through 60, inclusive is connected to a common output lead which, as will be shown more fully later, conveys PCM code pulses to a load such as a radio transmitter. The additional outputs H′ of each of gates 50 through 58 is connected respectively to inputs B of attenuators 30 through 38.

The second through sixth coding pulse outputs from distributor 20 are connected respectively to inputs A of attenuators 32 through 40 while the final or seventh coding pulse output of the distributor is connected in multiple to input A of attenuator 30 and input C of the remaining attenuators.

The sequence of operations involved in coding a sample will now be considered, starting with the storage of the sample on condenser 14 under control of the sampling pulse (Fig. 2). It will be assumed that at the beginning of the coding process the 24 decibel attenuator 30 is in the Loss-in condition while all the remaining attenuators are in the Loss-out condition. The polarity indicator 22 immediately applies an indication of the polarity of the sample to the polarity switch 24, and to gate circuit 48 as has been described. The polarity switch produces the positive potential V, representing the absolute magnitude of the sample, and E, the biased modification thereof is applied to the input of the chain of attenuators.

The first coding pulse produced by the coding pulse distributor and appearing at output (1) is passed through gate 48 as an On pulse to the radio transmitter on condition that the polarity indicator 22 indicates that the sample has a negative polarity. In case a positive polarity is indicated, the first pulse is not passed by the gate circuit and the first position of the code group is occupied by an Off pulse.

During the interval between the first and second coding pulses produced by distributor 20, the potential E is transmitted through the six attenuators and the amplifier 42, any transient build-up accompanying this transmission is allowed to dissipate, and the comparator 44 gives an indication whether or not the output $E_0$ of the final attenuator exceeds $E_R$. Since it was initially assumed that attenuator 24 was in the Loss-in condition and the remaining attenuators were in the Loss-out condition the comparator indication referred to above tells whether E exceeds $E_R$ by more or less than 24 decibels, neglecting for the moment the effect of amplifier 42.

If E is found to be more than 24 decibels greater than $E_R$, the potential condition applied by the comparator to each of the gates 50 through 60 is such as to prevent the transmission of pulses therethrough. Hence when the second coding pulse occurs, it does not reach output H or H′ of gate 50.

On the other hand, if E is not more than 24 decibels greater than $E_R$, gates 50 through 60 are conditioned to transmit pulses. In accordance with the timing arrangement of Fig. 2, only gate circuit 50 receives a coding pulse at this time. Thus of the conditioned gate circuits, only gate 50 may deliver a pulse to the radio transmitter from output H. If the gate circuit 50 is conditioned to transmit a pulse, a pulse is also applied from output H′ to input B of the associated attenuator 30. As has been stated, the application of a pulse to input B switches the attenuator to the Loss-out condition.

Simultaneously, and regardless of the comparator indication, the second coding pulse is applied to input A of the 12-decibel attenuator 32 and causes the corresponding value of loss to be inserted. Hence at this time there is either a net increase or a net decrease of 12 decibels in the value of $E_0$.

To restate these operations briefly, if E is greater than 24 decibels above $E_R$, no pulse is transmitted and the loss of the 24 decibel attenuator is left in effect; if E is smaller than 24 decibels above $E_R$, a pulse goes to the radio transmitter and the 24 decibel loss is removed. In either case, the loss of the 12 decibel attenuator is inserted in preparation for the next stage in the coding operation.

During the interval between the second and third pulses from distributor 20, the new value of E is transmitted through the remaining attenuator stages, transients are allowed to dissipate and the comparator gives a new indication as to the size of $E_0$, correspondingly conditioning the multipled gates 50 to 60. In this case, if the output of the 24 decibel attenuator exceeds $E_R$ by more than 12 decibels, the third coding pulse will not be transmitted and will not be allowed to remove the 12 decibel loss, whereas if the aforesaid output exceeds $E_R$ by less than 12 decibels, this coding pulse will be delivered by gate 52 to the radio transmitter and to the 12 decibel attenuator, removing its loss. In either case the 6 decibel attenuator 34 will be switched to the Loss-in condition.

In like manner the fourth, fifth, sixth and seventh coding pulses control succeeding stages of attenuation and are transmitted or not depending upon the signal amplitude. The seventh pulse produced by the pulse distributor and occurring in regular sequence with the other six, is applied directly to control input A of the 24 decibel attenuator 30 and control input C of all the other attenuators. Thus, at the end of the coding operation, the loss of the 24 decibel stage is inserted, and all other attenuation is removed, placing the device in the condition for coding the next sample, which condition is the same as that assumed for the first sample.

The succession of On and Off pulses delivered through the gate circuits to the transmitter constitute the desired PCM code group, a typical example of which is shown in Fig. 2 at line *j*.

In the foregoing description of the coder, mention was made of battery 28 which introduced a fixed bias to modify the sample amplitude V to obtain a new quantity E for application to the actual coding circuit. The introduction of such bias is of great importance in improving the performance of this type of coder as will appear from the following considerations.

Figure 4:
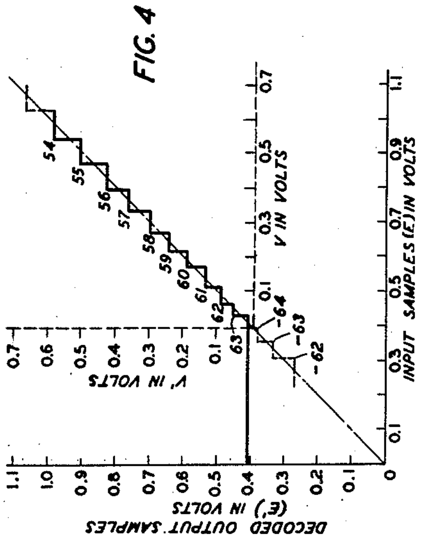
Fig. 4 is a graph illustrating the effect of the bias voltage introduced in accordance with the invention.

Fig. 4 represents the operation of the coder and shows the relationship between E, the amplitude of the quantity applied to the coding circuit proper and E′ which is the value represented by the resultant code group of pulses and thus the amplitude of the decoded output of the system. The particular values shown correspond to the coder of Fig. 1 and it is assumed that the range of input voltages E is to have a maximum value of 100 volts, the scales being calibrated in volts. The particular portion of the range illustrated in Fig. 4 extends from 0 to about 1 volt to allow clear representation of the characteristic near the origin. Since six code elements are available for the representation of the amplitudes of the samples E, it will be realized that 64 discrete or quantized levels, each representing a constituent amplitude range may be uniquely identified. Accordingly the values of E′ (each corresponding to one of the quantized amplitudes) represented by the treads of the staircase are assigned sequential numbers starting with 1 for the largest and extending to 64 for the smallest step.

It will be observed in Fig. 4 that steps 54 through 63 represent successive changes of 0.75 decibel in the amplitude of E. Step 64 however is shown as including a much greater range of amplitude. This comes about from the nature of the coding process. Each of the steps corresponds to a level a certain number of decibels below 100 volts (taken as the maximum input in the example) and is represented by a different six-element binary code group. These code groups represent the amount of attenuation necessary to reduce the applied sample E to a value less than the reference value $E_R$. From the explanation of the coder operation given above, it will be recognized that for a signal amplitude of 100 volts, all six attenuators will be inserted and that the corresponding code group will be 000000, representing a level of 0 decibel below 100 volts. Similarly, for step 63 only the final attenuator 40 will be required and the code group will be 111110 representing a value of E which is 46.5 decibels below 100 volts or .473 volt. The additional decrease in level which may be accomplished by removing attenuator 40 is 0.75 decibel so that for a code group of 111111, the last of the 64 possible combinations, the level represented is 47.25 decibels below 100 volts or 0.434 volt. Thus the code group 111111 corresponding to step 64 necessarily represents any value of E which is less than 0.434 volt.

Expressed in decibels below 100 volts the range covered by step 64 extends from 47.20 decibels to infinity. Expressed in volts it is about eleven times the range covered by the adjacent step 63. It will thus appear that there exists a considerable range of message signal amplitudes for which the same code group is transmitted. At the receiver, the decoder produces the value represented by this code group for all such low amplitude input signals and the signals, which may correspond to the speech waves for weak talkers, are lost.

Furthermore, if the polarity indicator is sufficiently sensitive to respond to small changes in input such as may result from the low amplitude background noise which is likely always to be present, the decoded signal will have the amplitude represented by the last code group and will change polarity with the background noise even though such background noise is of a maximum amplitude no greater than the minimum sensitivity of the polarity indicator. This produces an effective amplification of low amplitude background noise which is objectionable in the absence of signals.

On the other hand, if an attempt is made to eliminate this noise by decreasing the sensitivity of the polarity indicator, the result is clipping of the speech due to failure to respond to signals of amplitudes below the threshold of the first step.

In accordance with the invention these difficulties are overcome by introducing a bias potential which is added to the sample voltage V prior to the coding operation. This bias, indicated in Fig. 1 by battery 28, is made equal to the amplitude which is 0.75 decibel below the threshold of step 63 or 0.398 volt. Step 64 is thus equal to $$0.434-0.398=0.036 \text{ volt}$$

and is of the same order of magnitude as the adjacent step 63. In Fig. 4, the effect of the addition of this bias appears simply as a change from the coordinates E, E′ to the coordinates, V, V′ where $V=E-0.398$ volt and $V'=E'-0.398$ volt. It will be noted that the steps are shown as continued through the origin of V, V′ to illustrate the over-all characteristic which is obtained when polarities as well as absolute amplitudes are considered. Step 64 now includes values (of V) from 0 to 0.036 volt and of course step −64 covers values of V from 0 to −0.036 volt. Steps 63 and −63 have dimensions only slightly greater and it is clear that the tapered staircase extends smoothly through the origin of V, V′ with no step differing radically from its neighbor.

From the above, it is apparent that message signals of amplitudes below 0.4 volt may be transmitted over the system since it is now possible to assign different code groups to represent different amplitudes below that value.

Obviously, having modified the message samples prior to the coding operation, one must make an appropriate adjustment in the decoding equipment of the receiver. This is accomplished most readily by subtracting a bias equal to that added at the coder from each of the output samples from the decoder prior to their introduction to the smoothing filter. A decoder in which such adjustment is made will be considered below.

It should be noted that the absolute amplitude of the bias voltage employed will depend upon the number of code elements and the attenuator values employed. It must be pointed out, however, that equivalent improvements in performance may be obtained for any coder employing a non-linear scale of comparison.

Another source of noise attendant upon the use of small steps in the coding process is found in the fact that when such steps are used, the comparison between $E_0$ and $E_R$ must be made at a low level. Thus, if the maximum value of message signal actually applied to the coding circuit is 100 volts, $E_R$ is nominally 0.398 volt. The comparison of quantities of this order of magnitude requires relatively precise circuits and the accuracy of comparison becomes subject to such factors as supply voltage variations and the like. In accordance with the invention, therefore, an amplifier is inserted in the chain of attenuators to increase the level of the attenuator output and thus the level at which comparison may be made. Preferably the amplifier 42 is inserted between the first and second attenuators 30 and 32 and is given a fixed gain which is numerically as great as the 24-decibel loss of attenuator 30. In this fashion, the remaining attenuators as well as the comparator 44 benefit from an increased operating level. Since in the sequence of coder operation the loss of the 24-decibel stage is always inserted before a new signal sample is taken, and since this loss is not removed unless $E_0$ is found by the comparator to be smaller than $E_R$ in the first comparison, the voltage at the output of the amplifier can never exceed the permissible maximum value of E, or 100 volts.

With the amplifier 42 introduced, all potentials following it are increased by 24 decibels and the reference potential acquires a more favorable value, nominally 6.31 volts.

Figure 3:
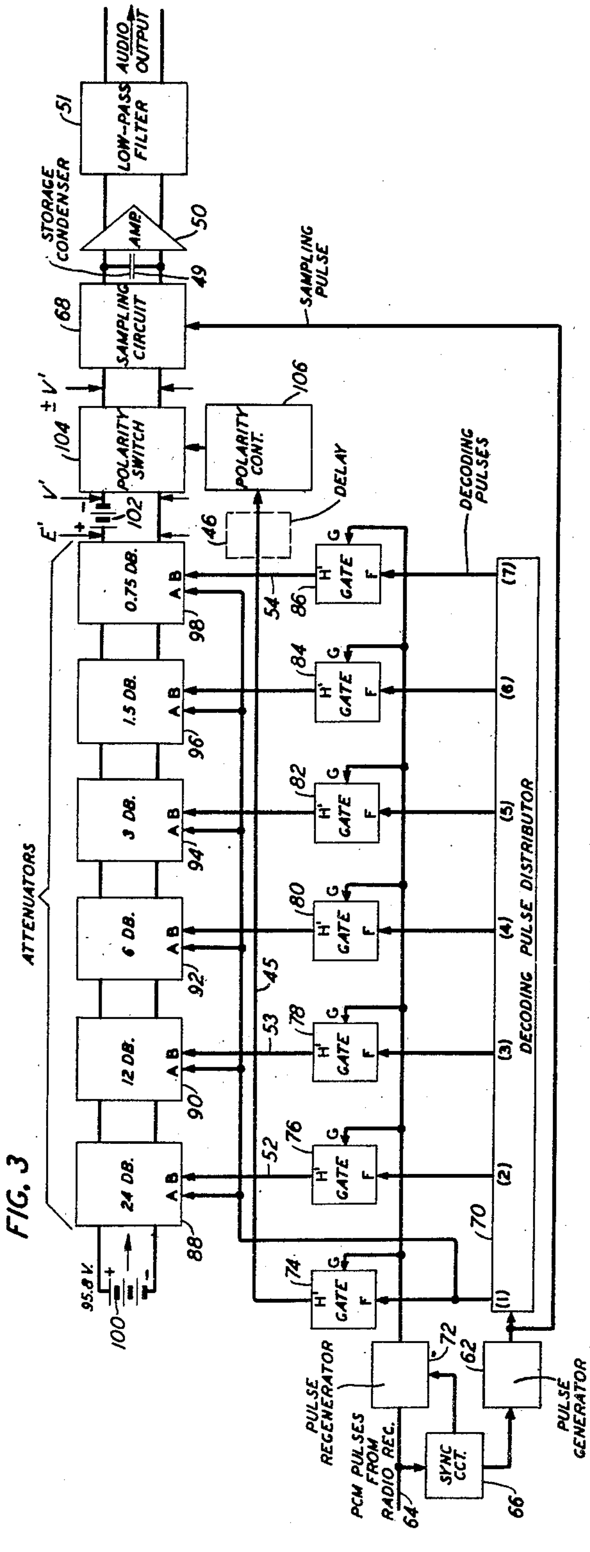
Fig. 3 is a block diagram of the decoder in accordance with the invention.

The code groups of pulses produced as described above by the coder and transmitted may be received by a conventional radio receiver and applied to a decoder, as shown in block form in Fig. 3, to control the reconstruction of the original message signal. The coder is in many respects similar to the decoder and is controlled by a pulse generator 62 which operates in synchronism with and may be of the same type as pulse generator 16 at the transmitter. Synchronism between these two pulse generators may be effected by any known means; for example, as is shown in Fig. 3, the pulses of the code groups entering on lead 64 may be applied to a synchronizing circuit 66 which provides regularly periodic waves or pulses from the code group pulses which may be applied to control the timing of pulse generator 62. One form of synchronizing circuit capable of operating in this fashion is disclosed in a copending application of G. Hecht, Serial No. 718,968, filed December 28, 1946 now Patent No. 2,489,883, issued November 29, 1949.

The pulse output of pulse generator 62 occurs in synchronism with and corresponds to the sampling pulse shown for the transmitter at line *a* of Fig. 2. These pulses are applied to a sampling circuit 68 to be considered below and also to a pulse distributor 70, identical to pulse distributor 20 at the transmitter, which is arranged in response to such pulses to produce seven separate trains of output pulses having the same relative timing and wave forms as the correspondingly numbered pulse outputs of the distributor in Fig. 1.

The code groups of pulses are also applied to a pulse regenerator unit 72 which reshapes the pulses to remove distortions introduced during radio transmission. This may be accomplished by clipping or otherwise reforming the pulses and in one advantageous regenerator the desired result is accomplished by slicing the pulses (that is clipping both the tops and bottoms thereof and transmitting only the center portions) and transmitting them through a gated amplifier under the control of a series of output pulses occurring at the code element rate obtained from synchronizing circuit 66. Circuits for performing these functions are disclosed in my copending application, Serial No. 772,913, filed September 9, 1947 now Patent 2,537,843 granted January 9, 1951 and in the Bell System Technical Journal for January 1948 at pages 29 and 30. By such means the pulses appearing at the output of the pulse regenerator 72 are standardized as to amplitude and timing.

The regenerated pulses are applied in multiple to a series of seven gate circuits 74 through 86 which correspond to similar gate circuits of the coder as illustrated in Fig. 1. Each of these gate circuits is provided with a control pulse input F, a code pulse input G and an output H′, and each is effective to produce an output pulse upon the simultaneous occurrence of a control pulse and a code element pulse in the corresponding input circuits. Control pulses for application to the inputs F of the gate circuits are obtained from pulse distributor 70 in such a way that gates 74 through 86 are enabled in turn at intervals corresponding to the code element intervals of the received code groups. Thus whenever an On code pulse is received a pulse will appear at the output H′ of the gate circuit which corresponds to that particular code element pulse.

A chain of six attenuators 88 through 98 is provided, these attenuators being in many respects similar to those employed in the coder of Fig. 1 and being arranged respectively to produce attenuations of 24, 12, 6, 3, 1.5 and 0.75 decibels corresponding to the attenuations introduced by attenuators 30 through 40 of coder. Each of these attenuators is furnished with two control inputs identified at A and B so arranged that a pulse applied at input A produces or maintains the Loss-out condition and a pulse applied at input B produces or maintains the Loss-in condition. In the absence of pulses at either input, the condition then obtained remains unchanged.

A constant potential of positive polarity is applied to the input of the chain of attenuators from a source indicated in Fig. 3 as a battery 100. This potential is made equal to that falling at the midpoint of the largest step at the coder. If the maximum value of the sample to be applied to the coder is taken as 100 volts as in the example considered above, the midpoint of the range represented by the largest step of the comparison scale is $\frac{1}{2}\times0.75$ or 0.375 decibel below 100 volts or 95.80 volts. For this value of maximum input the fixed source of voltage represented by battery 100 is arranged to produce an output of 95.8 volts.

It will be recalled that the first pulse of each code group conveys information as to the polarity of the message, the amplitude of which is represented by the ensuing pulses of the group. Accordingly the first pulse developed by pulse distributor 70 for any frame is applied in parallel to the input A of each of attenuators 88 through 98 to set them uniformly to the Loss-out condition prior to the receipt of ensuing code element pulses. The outputs of gate circuits 76 through 86 corresponding to the six code elements representing signal amplitude are applied respectively to inputs B of attenuators 88 through 98. Accordingly pulses transmitted through the appropriate gate circuits upon receipt of code element pulses are effective to switch the corresponding attenuators to the Loss-in condition.

The output of the attenuator chain appearing as a voltage E′ at the output of attenuator 98 upon the completion of a code group is always of positive polarity and of an amplitude E′ representing in quantized form the value of the message sample E applied to the attenuator chain of the coder of Fig. 1. Inasmuch as a bias voltage was added to the actual message signals sampled at the coder to obtain the value E, it is necessary to subtract a corresponding bias from the output of the attenuator chain of the decoder. If, as set forth above, the source of fixed potential 100 is given a value of 95.8 volts then the bias to be subtracted, which may be provided by a battery 102 connected in series with the output of E′ of the attenuator chain, may be of the same amplitude as the bias employed at the coder, that is 0.398 volt. The difference between the output voltage E′ and the bias is equal to V′ which is a quantized representation of the absolute amplitude corresponding to the message signal sample V appearing at the output of sampling circuit 10 at the transmitter.

This quantity is applied to a polarity switch 104 similar to polarity switch 24 of the transmitters which produces an output of absolute amplitude equal to its input and of polarity to be determined by the initial pulse of the corresponding received code group. For this purpose the pulse output H′ of gate circuit 74 is connected to a polarity controller 106 which is a form of double stability circuit having one condition of permanent stability and another condition of temporary stability. When an On pulse which represents one signal polarity is received, it is transmitted through gate circuit 74 to the polarity controller which is thereby switched from its permanent to its temporary condition of stability from which it returns after an interval determined by an R. C. circuit and preferably made slightly less than the period $t_s$ (Fig. 2)

of the sampling pulse. For the other condition of polarity Off pulse is transmitted and accordingly no pulse is available for application to the polarity controller which as a result remains in its permanent condition of stability. The polarity controller when in its permanent condition of stability provides an output effective to control the polarity switch for operation to one position and when in its temporary condition of stability, an output effective to change the polarity switch to its other position. The polarity of the output from polarity switch 104 is thus made positive or negative depending upon the polarity indicated by the first pulse of the received code groups.

*Component circuit details*

Figure 5:
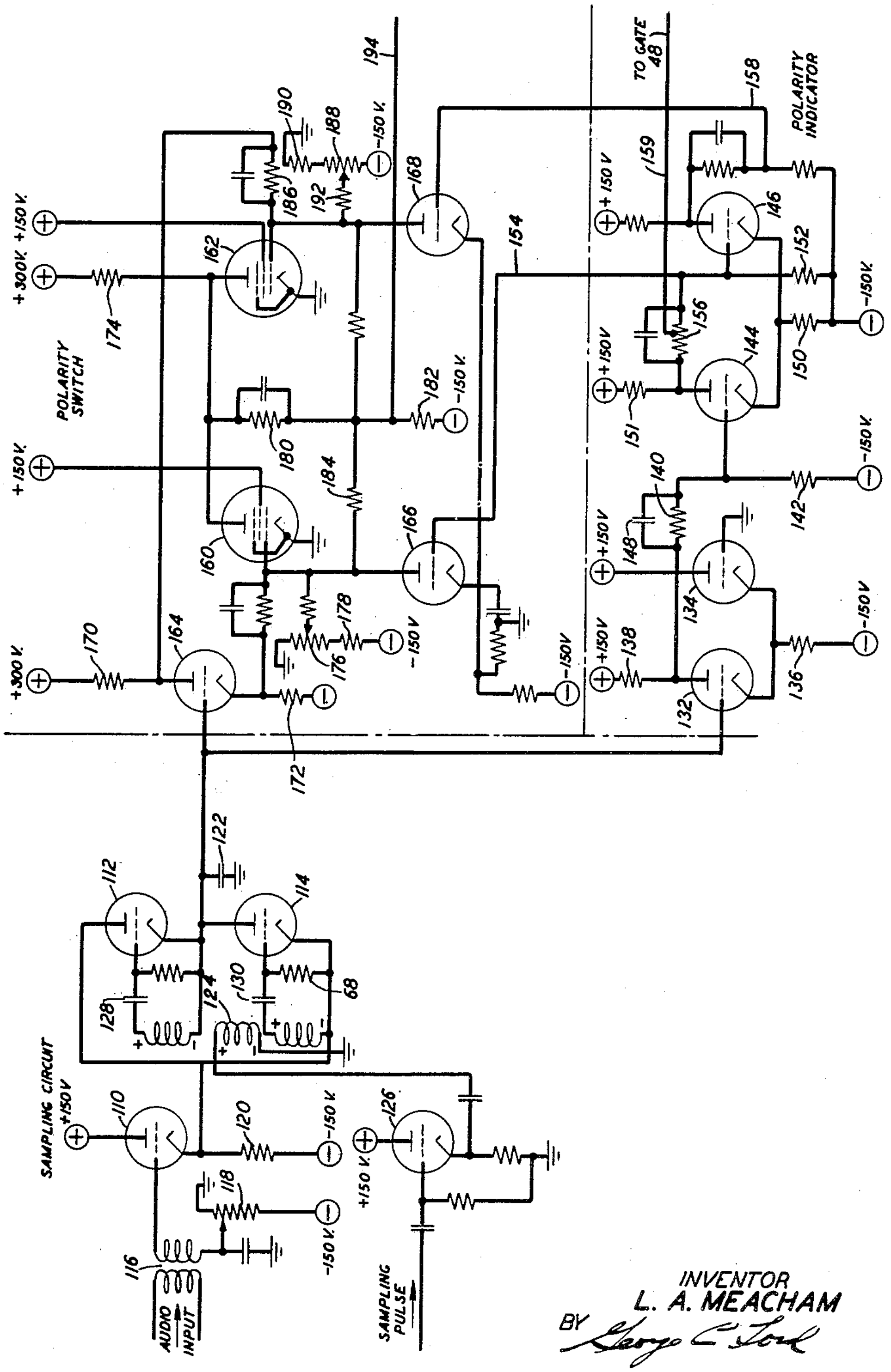
Figs. 5, 6, 7, and 8 are schematic circuit diagrams showing details of certain of the component circuits shown in block form in Figs. 1 and 3.

Fig. 5 is a diagram of a sampling circuit as indicated at 10 and 68 in Figs. 1 and 3, respectively, a polarity indicator as indicated at 22 in Fig. 1, and a polarity switch as indicated at 24 and 104 in Figs. 1 and 3, respectively.

The sampling circuit, shown in the left-hand portion of Fig. 5, comprises a cathode follower input stage employing a tube 110, and a two-way clamp or electronic switch comprising triode tubes 112 and 114. The wave to be sampled is applied to the cathode follower input stage through a transformer 116 in series with a negative bias potential obtained from a potentiometer 118 connected between a source of negative potential and ground. Tube 110 is arranged to operate as a conventional cathode follower, and the potential appearing across cathode resistor 120 constitutes a low impedance replica of the signal to be sampled. This output is applied to the anode of triode 112 and the cathode of triode 114 which are connected together. The cathode of triode 112 and the anode of triode 114 are connected together and to a storage capacitor 122. Sampling pulses are applied to the grids of triodes 112 and 114 through a transformer 124, having one primary and two secondary windings. The function of this clamping circuit is to provide alternately a low resistance path for current to flow in either direction between the cathode of cathode follower 110 and storage capacitor 122, and an open circuit between the same points.

Sampling pulses are shown in graph *a* of Fig. 2, and are applied to the primary winding of transformer 124 through a cathode follower stage comprising a triode type tube 126 connected in a conventional circuit. During each sampling pulse, tube 112 provides a conductive path for current flowing from cathode follower 110 to storage capacitor 122, and tube 114 provides a conductive path for current flowing in the opposite direction from the storage capacitor to the cathode follower. The direction of current flow thus depends upon which of these two points is at the higher potential when a sampling pulse is applied. The potential across the storage capacitor thus changes to become substantially equal to the potential at the cathode of follower 110, referred to ground. The sampling pulses are of amplitude sufficient to cause the tubes to pass considerable grid current. Grid rectification occurs and capacitors 128 and 130, connected in the respective grid circuits are charged negatively. Accordingly, the tubes are cut off between sampling pulses and no charge can flow in or out of the storage capacitor and the voltage thereon is held or stored.

The samples stored by the sampling circuit upon the storage capacitor are applied to a polarity indicator as shown in the lower right-hand portion of Fig. 5. This circuit, which comprises a differential amplifier and a pulse regenerating or slicing circuit, is arranged to produce a difference of potential between two output leads which is indicative of the polarity of the sample applied from the sampling circuit.

The differential amplifier comprises a pair of triode type vacuum tubes 132 and 134 having a common cathode resistor 136. The samples are applied to the control grid of triode 132, while the control grid of triode 134 is fixed at ground potential. A relatively high negative potential is applied to the cathode resistor 136 common to the two tubes. Thus if the sample has a large negative value, tube 132 is cut off while tube 134 is allowed to conduct. If, on the other hand, the sample has large positive value not exceeding that value which will saturate the tube 132 operates as a cathode follower with the result that the common cathode potential of tubes 132 and 134 becomes sufficiently high to cut off the flow of current through tube 134. Thus all the current through cathode resistor 136 must flow through the anode resistor 138 of tube 132. Finally, when the sample has a potential which is near ground potential (at which the grid of tube 134 is held) the current flowing through cathode resistor 136 is shared by the two tubes.

From the above it will be recognized that for a narrow range of small sample amplitudes, the current through anode resistor 138 changes between zero and the full value of the current through resistor 136, whereas for larger signal amplitudes, the current through anode resistor 138 remains either at zero or at a fairly constant and large value. Tube 132 can never draw grid current and therefore cannot affect the charge on the storage capacitor of the sampling circuit. Preferably the bias voltage from source 118 in the sampling circuit is so adjusted that for an input signal of zero amplitude, differential amplifier tubes 132 and 134 share the current through cathode resistor 136 equally to give optimum sensitivity to the differential amplifier.

The potential appearing across anode resistor 138 is applied through a voltage divider comprising resistors 140 and 142 connected between the anode of differential amplifier tube 132 and a source of negative bias potential to the control grid of vacuum tube 144 which is connected with vacuum tube 146 in a pulse regenerating or slicing circuit. A neutralizing capacitor 148 is connected across voltage divider resistor 140 to balance the effect of the grid capacitance of tube 144 and thus to improve the high frequency response thereof.

Tubes 144 and 146 which may conveniently be triode type tubes constitute a slicing circuit of the type disclosed in my copending application Serial No. 772,913 filed September 9, 1947, now Patent No. 2,537,843 granted January 9, 1951, and also in the Bell System Technical Journal for January 1948 at pages 29 and 30. This circuit provides a reversible trigger action between two conditions of stability, characterized as follows. If the potential applied to the control grid of tube 144 exceeds a certain set value or critical potential, tube 144 conducts while tube 146 is cut off; if on the other hand the potential applied to the grid of tube 144 is less than the preset value mentioned above, tube 144 is cut off while tube 146 conducts. The reversible action is obtained by virtue of the fact that the anode of tube 144 is resistively coupled to the grid of tube 146 and the two tubes share a common cathode resistor 150. An anode resistor 151, through which positive potential is supplied to tube 144, is provided and has a value only slightly greater than the minimum necessary to make the circuit unstable when the grid of tube 144 is at the critical potential. A bias equal to the critical potential referred to above is applied to the grid of tube 146 through a resistor 152 from a suitable source of negative potential. Two output connections are provided for controlling the polarity switch. One of these, 154, is connected through the coupling resistor 156 to the anode of tube 144, while the other (158) is connected in similar fashion through resistor 160 to the anode of tube 146. An additional output 159 for connection to input G of gate 48 (Fig. 1) is provided from a tap on resistor 156.

It will thus appear that if the potential applied as input to the pulse regenerating circuit from the differential amplifier is negative with respect to the fixed potential, current will flow in tube 146 with the result that the potential on output lead 154 will be positive with respect to that on lead 158, while if the input potential is positive, current will flow through tube 144 with the result that the potential on lead 158 will be positive with respect to that on lead 154.

The differences in potenital between leads 154 and 158 are employed to control a polarity switch which in response to a sample of either polarity stored on storage capacitor 122, produces an output of the sample amplitude and of positive polarity. The polarity switch comprises a pair of amplifier tubes 160 and 162, a phase inverter stage comprising a triode tube 164 and a pair of control tubes 166 and 168 associated respectively with amplifiers 160 and 162. The samples from storage capacitor 122 are applied to the control grid of tube 164 to produce, across anode and cathode resistors 170 and 172 respectively, two outputs which are opposite in polarity.

The potential appearing at the cathode of tube 164 is essentially a copy of that on the sample storage capacitor 122 and is applied to the control grid of amplifier 160 which may conveniently comprise a pentode type tube. This amplifier and the identical amplifier 162 share a common anode resistor 174. A suitable negative bias voltage derived from potentiometer 176 connected in series with a fixed resistor 178 between a source of negative potential and ground is also applied to the control grid of pentode 160. A feedback connection is made between the anode of tube 160 and the control grid thereof through a voltage divider, comprising resistors 180 and 182 connected between the anode and a source of negative potential, and a series resistor 184. The control grid of tube 160 is in addition connected to the anode of triode type control tube 166. The control grid of this tube is energized by a potential appearing on polarity indicator output lead 154, while a steady negative bias is applied to its cathode from a suitable source of negative potential.

The remainder of the polarity switch is essentially a repetition of the elements already described, with similar connections being made to amplifier 162 and its control tube 168. Here, however, the potential from the anode of the phase inverter 164 is applied through a resistor 186 to the control grid of amplifier 162 where it is superimposed upon a negative bias obtained from potentiometer 188, connected in series with a fixed resistor 190 between a source of negative potential and ground, and applied through series resistor 192, this bias voltage being of sufficient amplitude to counteract the large positive potential present at the anode of the phase inverter tube. The control potential occurring on output lead 158 of the polarity indicator, is applied to the control grid of tube 168.

If lead 154 is sufficiently negative to prevent conduction of control tube 166 and if amplifier tube 162 is also rendered non-conductive, amplifier 160 functions as a feedback amplifier delivering an amplified replica of the signal on the cathode of phase inverter 164 to an output lead 194 connected through resistor 180 to the anodes of the two amplifier tubes. If on the other hand control tube 168 and amplifier tube 160 are rendered non-conductive, amplifier tube 162 functions as a feedback amplifier to deliver a replica of the signal on the anode of phase inverter 164 to output lead 194.

The two potentials which lead 154 may assume are so adjusted that for the more positive potential, control tube 166 is rendered conductive, while for the more negative potential, the flow of current through this tube is cut off. When control tube 166 is conductive, the drop in its anode potential makes the grid potential of amplifier tube 160 sufficiently negative to prevent the flow of current through that tube. The values of potentials which may be assumed by lead 158 are similarly chosen so that for the more positive value, control tube 158 conducts to cut off amplifier tube 162 and for the more negative value, control tube 168 is cut off and amplifier tube 162 is allowed to pass current.

Accordingly, when the sample stored on storage capacitor 122 is of positive polarity and lead 154 is more positive than lead 158 due to the action of the polarity indicator described above, amplifier 162 is allowed to amplify the inverted signal appearing on the anode of phase inverter 164. Since another inversion of polarity occurs in amplifier 162, the sample appears with positive polarity on output lead 194. On the other hand when the stored sample is of negative polarity, indicator output lead 158 becomes positive with respect to lead 154, and amplifier 160 is allowed to amplify the direct replica of the sample appearing at the cathode of phase inverter 164. Since an inversion takes place in amplifier 160, the negative sample also appears in positive polarity on output lead 194.

By proper proportioning of the components of the polarity switch and by proper adjustment of the several bias voltages, the value of the potential appearing on output lead 194 in response to a signal of zero amplitude in the storage capacitor may be made effectively the same for either of the two stable positions of the polarity indicator, that is, whether amplifier 160 or amplifier 162 is allowed to conduct. Furthermore, the potential appearing on output lead 194 for this particular condition may be adjusted to any prescribed value within a considerable range, and in particular, may be given a value which effectively incorporates the 0.398 volt bias represented by battery 28 of Fig. 1.

Figure 6:
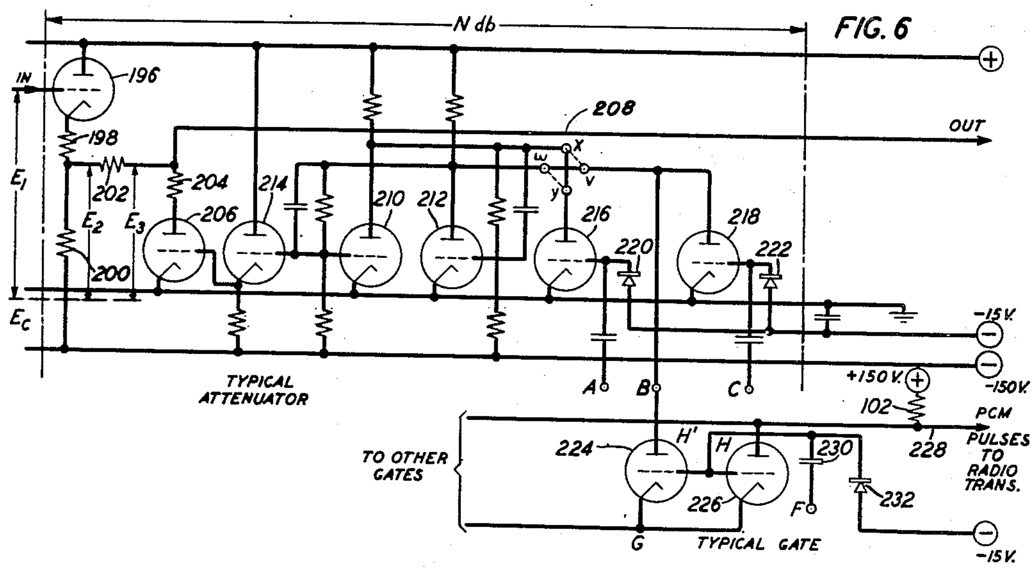

The potentials appearing on output lead 194 of the polarity switch are applied to the attenuator stages of the coder one of which is shown in detail together with the gate circuits by which it is controlled in Fig. 6 of the drawings. All the attenuators employed in both the coder of Fig. 1 and decoder of Fig. 3 are essentially alike except for the nominal losses introduced thereby and indicated as $Ndb$ in Fig. 6. It will be understood that where input B or C is omitted from an attenuator in Fig. 1 or 3, the control elements associated with the corresponding input in Fig. 6 may be omitted.

The attenuator proper comprises a cathode follower input stage 196, resistors 198, 200, 202, 204 and an attenuator tube 206. The remaining circuits of Fig. 6 constitute the control means whereby the attenuator may be shifted from its Loss-in to its Loss-out condition, or vice versa. In this attenuator the cathode resistor of the cathode follower stage comprises resistors 198 and 200 connected in series between the cathode and a source of negative potential indicated at −150 volts. The junction of resistors 198 and 200 is connected through resistors 202 and 204 in series to the anode of attenuator tube 206 and the junction of the two last-mentioned resistors is connected to attenuator output lead 208. Attenuation is provided or not, depending upon the applied control signals, by the voltage divider comprising resistors 202, 204 and tube 206 connected in series. When the grid of tube 206 is made sufficiently negative with respect to ground, the flow of current through this tube is cut off, and the tube represents a high impedance. Under these circumstances the voltage occurring at the junction of resistors 198 and 200 appears without loss on output lead 208 and the so-called Loss-out condition is obtained. If on the other hand, the grid of tube 206 is carried strongly positive, the tube becomes conductive and offers a relatively low impedance. Then the voltage at the junction of resistors 198 and 200 appears on lead 208 attenuated by an amount 204 determined primarily by the relative values of resistors 202 and 204, and the so-called Loss-in condition is obtained.

The proportions of the attenuator elements may be chosen according to the following criteria. The input amplitude $E_1$ and output amplitude $E_3$ (Fig. 6) are preferably measured from a common point of reference potential $E_c$, where $E_c$ is so chosen that for the Loss-in condition the ratio $E_2/E_3$ remains constant with respect to variations of $E_1$. $E_c$ may be determined by reducing $E_1$ until $E_2$ and $E_3$ become equal. This is the limiting condition representing zero signal amplitude, and corresponds to zero current through resistors 202 and 204. $E_c$ is the potential then existing at either terminal of resistor 202. The ratio of resistor 198 to resistor 200 should then be so chosen that for this zero condition the grid of tube 196 is also at the potential $E_c$. This adjustment can always be realized if the cathode current of tube 196 drawn through resistors 198 and 200 represents only a moderate load for the tube, so that its cathode is always at a higher potential than its grid. With the ratio of resistors 198 and 200 thus established, the ratio $E_1/E_3$ is constant with respect to variations of $E_1$. It is then necessary to choose resistors 202 and 204 so that when tube 206 is switched from the Loss-in to the Loss-out condition, for some large value of $E_1$, the amplitude of $E_3$ will change by N decibels. With existing devices, these adjustments can be achieved only to a moderately close approximation. In particular, the plate impedance of tube 206 in the Loss-in condition does not remain constant as the plate current approaches zero, and therefore it may be preferable to determine $E_c$ by well-known extrapolation methods rather than by actually reducing the plate current of tube 206 to zero.

The control inputs of the attenuator stage are shown at A, B and C in Fig. 6 and correspond to similarly identified input connections in Fig. 1. Furthermore, by breaking the connections between points $u$ and $v$ and between points $x$ and $y$ in Fig. 6, and connecting $u$ to $y$ and $x$ to $v$ as indicated by dashed lines, the inputs A and B may be made to correspond to similarly identified inputs in Fig. 3. Control pulses applied to these inputs are effective to control the conditioning of a conventional flip-flop multivibrator having two conditions of permanent stability, and comprising vacuum tubes 210 and 212. The anode of vacuum tube 212 is connected through a buffer amplifier stage 214 to the control grid of attenuator tube 206 and the condition of the attenuator is thus determined by the condition of stability occupied by the flip-flop circuit. Triggering pulses are applied to the flip-flop circuit from inputs A and C through tubes 216 and 218, respectively, and to input B from a gate circuit corresponding to the gate circuits shown in Figs. 1 and 3. Tubes 216 and 218 are normally biased to cut-off by negative potentials applied to their control grids through varistors 220 and 222, respectively. Positive pulses applied to input A cause tube 216 to conduct thus producing a negative pulse at the anode of tube 216. This triggers the flip-flop multivibrator to the condition of stability in which tube 210 conducts and tube 212 is cut off. The anode of tube 212 and thus the grid of buffer amplifier 214 are thus driven more positive with the result that the output of amplifier 214 which operates as a cathode follower is made strongly positive to switch the attenuator to the Loss-in condition.

Trigger tube 218 functions similarly in response to a positive pulse applied to input C to apply a negative pulse to the grid of tube 210 which is effective to switch the flip-flop circuit to its second condition of stability. Under such circumstances, the anode of tube 210 becomes more positive, while that of tube 212 becomes less positive, and the resultant negative potential applied from the grid of tube 210 through cathode follower 214 to attenuator tube 206 is sufficient to cut off that tube and switch the attenuator to the Loss-out condition. A negative pulse applied to input B has the same effect as a positive pulse applied to input C.

At appropriate times, negative pulses are aplied to input B of the attenuator from the gate circuit shown in the lower portion of Fig. 6. This gate circuit comprises a pair of triode type tubes 224 and 226 having their cathodes and control grids connected in multiple. The anode of triode 226 corresponds to the output H shown in Fig. 1 and is connected to lead 228 leading to the radio transmitter, while the anode of tube 224 corresponding to the output of H′ of Figs. 1 and 3 is connected to input B of the attenuator. The common cathode connection of tubes 224 and 226 corresponds to input G of the gate circuit as shown in Figs. 1 and 3. It should be understood that where output H or H′ is not shown in the gate circuits of Figs. 1 and 3, the corresponding tube 226 or 224 may be omitted. Positive gating pulses are applied through a capacitor 230 from input F (Fig. 1 or 3) to the control grids of the two gate tubes and are superimposed upon a negative bias applied through the varistor 232. If the input applied to terminal G is at ground potential, the positive pulses from input F are transmitted through the two gate tubes 224 and 226 appearing as negative pulses at attenuator input B and on output lead 228. If, on the other hand, the input to G is positive with respect to ground, the pulses applied to input F will not cause current to flow in the gate tubes.

Figure 7:
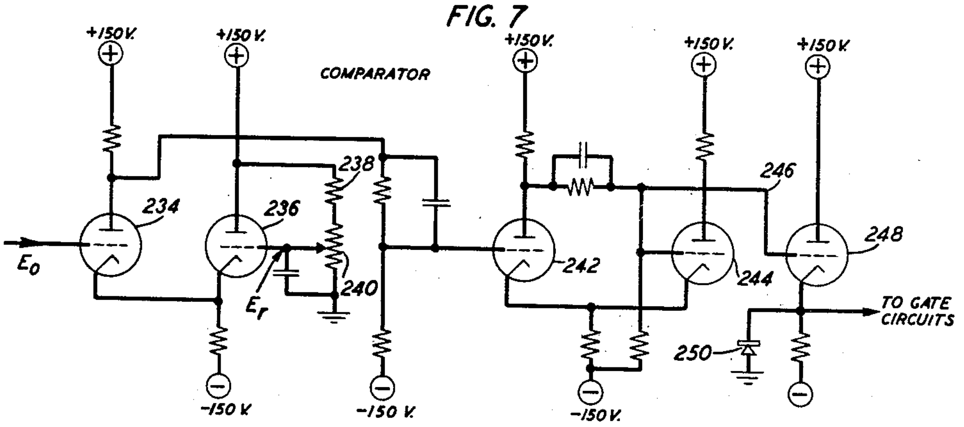

Fig. 7 shows the detailed circuit corresponding to comparator 44 of Fig. 1. This device is similar in design and operation to the polarity indicator of Fig. 5. Vacuum tubes 234 and 236 constitute the differential amplifier and function in the same way as tubes 132 and 134 of the polarity indicator, although in the present case, the control grid of tube 236 is biased above ground to a reference potential $E_r$ obtained from a voltage divider comprising a resistor 238 and a potentiometer 240 connected in series between a source of positive potential and ground. The voltage applied to the control grid of differential amplifier tube 234 corresponds to $E_0$ the output of the attenuator chain, and the output of the differential amplifier represents the amplified difference $E_r - E_0$. This output is applied to a slicing circuit comprising vacuum tubes 242 and 244 which is similar in all respects to the corresponding circuit comprising tubes 144 and 146 of Fig. 5. The output of this circuit appearing on lead 246 accordingly has two alternative stable values one of which is more positive than the other. This lead is connected to the control grid of a cathode follower type buffer amplifier 248 to drive the input G of the gate circuits. Thus if $E_0$ exceeds $E_r$, tube 242 of the slicer circuit is rendered non-conductive. Output lead 246 then has its more positive value and the output of cathode follower 248 is raised above ground potential. This prevents the transmission of pulses through the gate circuits. If on the other hand $E_0$ is less than $E_r$, tube 242 conducts, lead 246 has its more negative value and cathode follower tube 248 is cut off. A varistor connected between the cathode of tube 248 and ground holds the cathode at ground potential during this interval.

The component circuits of the decoder are similar to those described above with principal reference to the coder and may be readily obtained therefrom by obvious minor modifications, several of which have been pointed out specifically. Consequently, only the polarity controller 106 of Fig. 3 need be considered in detail. It should be noted, however, that the bias symbolized by battery 102, Fig. 3, may be introduced by proportioning the voltage divider comprising resistors 180 and 182 (Fig. 5) of polarity switch 104 of the decoder so that when all the attenuators are in the Loss-in condition, giving a value of 0.398 volt for the potential E′, the value of the potential ±V′ at the output of the polarity switch is zero regardless of whether that switch is in the inverting or non-inverting condition.

Figure 8:
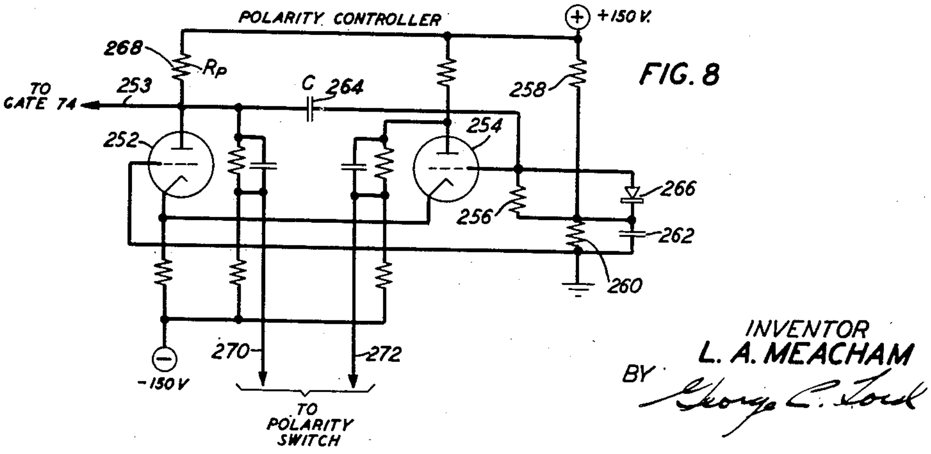

The polarity controller is shown schematically in Fig. 8. A pair of triode type tubes 252 and 254 are connected as a conventional single trip multivibrator having two conditions of stability, one of which is normally occupied and may be identified as permanent and the other transitory. The control grid of tube 254 is normally biased positively with respect to the control grid of tube 252 by virtue of the connection through resistor 256 to the junction of voltage divider resistors 258 and 260 connected between a source of positive potential and ground to which the control grid of tube 252 is connected. Accordingly tube 254 normally conducts, and capacitor 264 connected between the anode of tube 252 and the grid of tube 254 is charged. When a negative pulse is applied over lead 253 from the output of gate 74, Fig. 3, the circuit is triggered to the transitory condition, in which tube 252 conducts and tube 254 is cut off in the usual manner. This condition persists for an interval determined by the discharge of coupling capacitor 264 through a resistive path which comprises principally grid resistor 256 of tube 254. At the end of this interval which is made slightly greater than the interval occupied by a code group, the circuit reverts to its normal condition. Capacitor 264 then recharges rapidly through a path comprising a varistor 266 connected across resistor 256, a large capacitor 262, the power supply and the relatively small resistance of anode resistor 268 connected between the power supply and the anode of tube 252.

Thus if the polarity controller is triggered by a received PCM code pulse occurring at the time of the first pulse produced by decoding pulse distributor 70, Fig. 3, it remains in the triggered condition until after the occurrence of the next sampling pulse, then reverts to its normal condition. Two voltage dividers are provided in the polarity controller of Fig. 8, one connected between the anode of each of the tubes 252 and 254 and a source of negative potential to energize output leads 270 and 272 at suitable levels of direct current potential for application to the grids of tubes corresponding to tubes 166 and 168 in the polarity switch of the decoder.

What is claimed is:

1. In a pulse code modulation system for transmitting signal waves by code groups of pulses, means for recurrently sampling the amplitude of a signal wave, a coder for representing the amplitude of each sample by a code group of pulses according to a permutation code in which the code groups correspond to amplitudes expressed on a non-linear scale, means for modifying said samples by addition thereto of a quantity equal to the lowest amplitude represented by a code group of said code and applying said modified samples to the coder, means for transmitting said code groups, a receiver and means at the receiver for reconstructing the modified samples from the corresponding code groups, means for subtracting from each reconstructed sample a quantity equal to that added at the transmitter and means for combining the resultant samples.

2. In a system for transmitting signal waves by code groups of pulses, means for recurrently sampling the amplitude of a signal wave, a coder for representing the amplitude of an applied sample by a code group of pulses according to a permutation code in which the amplitudes represented by adjacent code groups have the same ratios, a first source of potential connected between said sampling means and said coder, the potential being equal to the lowest amplitude represented by a code group in said code and of polarity to add to said sample, means for transmitting said code groups, a receiver, means at the receiver for producing pulses of amplitude corresponding to each code group, means for combining said amplitude pulses, and a second source of potential connected between said two last-mentioned means, the potential being equal to that of said first source of potential and of polarity to subtract from said amplitude pulses.

3. In a coder for pulse code modulation, means for recurrently sampling the amplitude of a signal wave, means for producing a reference potential and comparing said samples therewith, a plurality of attenuators of related values selectively insertable in tandem at a point in the circuit between said sampling and comparing means to produce a range of total attenuations the adjacent attenuations being equal, means connected between said sampling means and the point of insertion of any of said attenuators for adding to each sample a quantity equal to the attenuated output obtained when a sample of maximum possible amplitude is acted upon by all attenuators in tandem, means for inserting each attenuator in turn between said sampling and comparing means, means responsive to said comparing means for removing any attenuator the addition of which causes reduction of the attenuated sample below said reference potential, and means for transmitting a code pulse for each attenuator remaining in circuit at the completion of a coding operation.

4. In a coder for pulse code modulation, means for recurrently sampling the amplitude of a signal wave, a plurality of attenuators of related values selectively insertable in a circuit connected in the output of said sampling means, means for producing a reference potential of amplitude related to that of the smallest signal to be transmitted and means for comparing said reference potential with said samples after attenuation, means connected in circuit between said sampling means and the point of insertion of said attenuators for adding to each sample a potential equal to the quantity obtained for comparison when the maximum sample amplitude is acted upon by the maximum possible attenuation, means for inserting each attenuator in turn in a coding cycle and removing it unless the attenuated sample exceeds the comparison quantity, and means for producing a group of bi-valued pulses, equal in number to said attenuators and indicative of which attentuators remain in circuit at the completion of a coding cycle.

5. In a communication system in which periodic samples of a message wave are transmitted as code groups of pulses according to a permutation code wherein the amplitude represented by each code group bears the same ratio to the corresponding adjacent amplitude, a coder for producing code groups of pulses representing the message wave samples, and a source of potential connected in series with and arranged for biasing the operation of said coder by adding to each sample a fixed quantity of the same order as the lowest amplitude represented by a code group of said code.

6. In a communication system in which samples of a message wave are transmitted as code groups of pulses according to a permutation code wherein the amplitudes represented by adjacent code groups bear the same ratio, a coder producing code groups of pulses representing the message signal samples, means for biasing the operation of said coder by adding to each sample a constant quantity of the same order of magnitude as the lowest amplitude represented by a code group of said coder, means for transmitting said code groups, a receiver, means at the receiver for reconstructing the modified samples from the corresponding code groups, and means for subtracting from each reconstructed sample a quantity corresponding to that added by biasing said coder.

7. In a coder for pulse code modulation, means for sampling the amplitude of a signal wave to be transmitted, a plurality of attenuators of related attenuations, means for producing a reference potential of amplitude related to that of the smallest signal to be transmitted and comparing said reference potential with the output of said sampling means, an amplifier of gain equal to the largest attenuation afforded by any of said attenuators, means for permanently connecting said amplifier in circuit between said sampling and comparing means, means for selectively inserting the attenuator of greatest attenuation in tandem between said sampling means and said amplifier, means operative after said last-mentioned means for inserting each of the remaining attenuators in turn in tandem between said amplifier and said comparing means, and means for removing the last inserted attenuator whenever the reference potential exceeds the attenuated sample amplitude.

8. In a coder for pulse code modulation, means for sampling the amplitude of a signal wave to be transmitted, a plurality of attenuators of related attenuations, means for producing a reference potential bearing a fixed relation to the smallest signal amplitude to be transmitted and comparing said reference potential with the output of said sampling means, an amplifier of gain equal to the largest attenuation afforded by any one of said attentuators, means for permanently connecting said amplifier in circuit between said sampling and comparing means, means connected in tandem between said sampling means and said amplifier to add to each sample a potential equal to that which would be obtained if a sample of maximum amplitude were acted upon by the total attenuation of all of said attenuators, means for selectively inserting the attenuator having largest attenuation between said last-mentioned means and said amplifier, means operative thereafter for inserting each of the remaining attenuators in the order of decreasing attenuation between said amplifier and said comparing means, means for removing the last inserted attenuator whenever the reference potential exceeds the attenuated sample potential, and means for transmitting a pulse for each attenuator remaining inserted at the completion of a coding operation.

LARNED A. MEACHAM.

REFERENCES CITED

The following references are of record in the file of this patent:

UNITED STATES PATENTS

| Number | Name | Date |
|---|---|---|
| 1,849,818 | Bedford | Mar. 15, 1932 |
| 2,181,309 | Andrieu | Nov. 28, 1939 |
| 2,296,919 | Goldstine | Sept. 29, 1942 |
| 2,326,083 | Wendt | Aug. 3, 1943 |
| 2,363,800 | Moffett | Nov. 28, 1944 |
| 2,400,574 | Rea | May 21, 1946 |
| 2,403,561 | Smith | July 9, 1946 |
| 2,409,229 | Smith | Oct. 15, 1946 |
| 2,435,840 | Morton | Feb. 10, 1948 |
| 2,437,707 | Pierce | Mar. 16, 1948 |
| 2,438,908 | Goodall | Apr. 6, 1948 |
| 2,449,467 | Goodall | Sept. 14, 1948 |
| 2,451,044 | Pierce | Oct. 12, 1948 |
| 2,453,454 | Norwine | Nov. 9, 1948 |
| 2,453,461 | Schelleng | Nov. 9, 1948 |
| 2,464,607 | Pierce | Mar. 15, 1949 |